United States Patent [19]

Rhodes

[11] Patent Number: 4,654,057
[45] Date of Patent: Mar. 31, 1987

[54] DEHUMIDIFIER

[76] Inventor: Barry V. Rhodes, Rte. 1, Box 595, Chickamauga, Ga. 30707

[21] Appl. No.: 846,805

[22] Filed: Apr. 1, 1986

[51] Int. Cl.$^4$ ............................................. B01D 53/04
[52] U.S. Cl. .......................................... 55/208; 55/33; 55/387
[58] Field of Search ....................... 55/33, 35, 74, 208, 55/387

[56] References Cited

U.S. PATENT DOCUMENTS

| | | | |
|---|---|---|---|
| 3,296,773 | 1/1967 | Hemstreet | 55/208 X |
| 3,713,281 | 1/1973 | Asker et al. | 55/387 |
| 4,040,804 | 9/1977 | Harrison | 55/208 X |

FOREIGN PATENT DOCUMENTS

| | | | |
|---|---|---|---|
| 0037430 | 3/1983 | Japan | 55/208 |

OTHER PUBLICATIONS

Deltech Air Dryer Bulletin, Deltech Engineering, Inc., 1967, Form 300.

*Primary Examiner*—Charles Hart
*Attorney, Agent, or Firm*—Alan Ruderman

[57] ABSTRACT

A dehumidifier package for use in a residence in the form of a box having front and rear walls spaced apart and having silica gel particles bonded to the interior surfaces. End walls connect the front and rear walls so as to form an air flow channel through the box for permitting air to flow over the silica gel. In one embodiment the top and bottom of the box are open and air flows through the box through the natural draft created as the air becomes lighter and rises. In another embodiment air is forceably drawn through the box by means of a powered fan pulling air from the bottom and exhausting the air near the top. A regeneration chamber may be provided in which the bottom of the box can be positioned to communicate with a plenum chamber in the regeneration box, the plenum chamber communicating with an opening through which hot air may be directed.

13 Claims, 7 Drawing Figures

DEHUMIDIFIER

BACKGROUND OF THE INVENTION

This invention relates to dehumidification of air in a room, and more particularly to a desiccant container having desiccant on walls thereof spaced apart to provide a channel through which air in the room may flow for controlling the latent heat and water vapor in the air.

It is known to use a desiccant such as silica gel in large beds within tanks configured so that the air may pass through the desiccant bed. Although the surface area of such tanks is large compared to its depth, the depth of the beds are such that large pressure drops result from the air flowing therethrough. Compressors or other large energy consuming devices are therefore necessary for overcoming the pressure drop as the air flows through the bed. Consequently, such desiccant beds are impractical for use in a residence, and other dehumidification devices, including air conditioning, are in use.

Control of the relative humidity of the air within a room for comfort and for elimination of health problems by means of air conditioning can be relatively expensive, especially in certain parts of the country. This cost is not affordable to many people. Large dehumidifiers utilizing similar principles to air conditioning also may not be affordable to all people. As aforesaid prior art desiccant dehumidification may not only be costly, but impractical for use in a home.

SUMMARY OF THE INVENTION

Consequently, it is a primary object of the present invention to utilize the water vapor absorption abilities of a desiccant to control the relative humidity of the air within a residential environment in an inexpensive manner.

It is another object of the present invention to provide a desiccant containing package through which air may flow with little or substantially no pressure drop such that the air may flow through the package by natural convection.

It is a further object of the present invention to provide a desiccant containing package having a decorative configuration suitable for use in residences and which provides effective water vapor absorption from the air at minimal cost while concomitantly improving the general quality of the air.

Accordingly, the present invention provides a desiccant containing package having a pair of walls spaced closely apart to form a flow channel therebetween, the walls having a desiccant such as silica gel affixed thereto for absorbing water vapor from the air stream. The package may be in the form of a box or the like open at opposite ends, such as the top and bottom thereof. As the water vapor in the air within the channel is absorbed by the desiccant, the latent heat of vaporization is released, and this together with the reduction of water vapor within the air results in the air rising through the channel drawing additional air through the channel creating a natural draft to continue the flow of air through the package.

The box may be in a decorative form and may carry a picture or the like whereby it can be hung upon the wall within the residence. In another form of the invention, forced convection can be provided by a small fan or the like mounted in the box.

Indicator particles of silica gel may be secured within the channel and a small window available for viewing when the desiccant is saturated may be provided. When saturated, regeneration of the desiccant may be accomplished by heating the desiccant to release the water therein by removing the package to a non residential convenient location.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
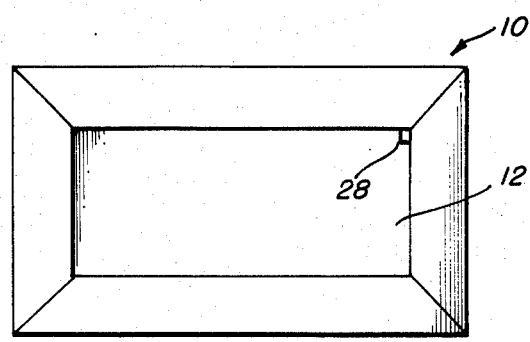
FIG. 1 is a front elevational view in diagrammatic form of a desiccant containing dehumidifier constructed in accordance with the principles of the present invention having the configuration of a picture frame.

Referring now to the drawings, a dehumidifier 10 constructed in accordance with the principles of the present invention may comprise a box or the like formed from cardboard or a plastic material which may be injection molded into the desired form. The box includes a front wall 12, a rear wall 14, and a pair of side walls 16, 18. As illustrated in FIG. 1, the front wall 12 may be in the form of a picture frame for supporting a picture, or may have other decorative designs thereon for use within a residence. The box may be of any desirable configuration and size, but the depth of the box, i e , the side walls 16, 18 are envisioned as being approximately one inch. A space 20 is formed between the front and rear walls 12, 14 and the side walls 16, 18 to define a channel.

Suitably secured to the interior face of each of the front and rear walls 12, 14 are silica gel particles, the particles being fastened to the walls by means of a suitable glue such as a room temperature vulcanizing silican rubber. The glue is applied to the walls as a thin layer 24 or in liquid form so that the particles adhere thereto and substantially only a single layer of the silica gel desiccant is disposed on the walls within the channel, the thickness of the glue being only a small percentage of the thickness of each substantially spherical particle of the silica gel. The silica gel, being a porous rock mineral, has particles of a substantially spherical configuration and the particles are of such a size so as not to extend excessively into the chanel, and the glue is approximately 10 percent of the thickness of the spherical particles so that a substantial portion of the surface of the particles is available for absorption of water vapor.

In use the air initially in the channel 20 contains water vapor, the amount depending upon the relative humidity of the air, and sufficient amounts of this water vapor is absorbed by the silica gel particles 22 disposed on the walls within the channel. As the water vapor is condensed out of the air the latent heat of vaporization or condensation is released, and this heat is released into the air within the channel. As the air is heated and as the water vapor is removed therefrom, the air becomes lighter and rises, gradually exiting from the top of the channel 20. As the air flows through the channel it is replaced at the bottom of the channel by cooler air due to the natural draft resulting from the rising air. The air in the room thus gradually becomes drier until the silica gel on the walls has absorbed a saturating amount of water vapor. No further absorption or condensation will thereafter take place since the desiccant has absorbed all that it can under that condition. Silica gel can absorb approximately 40 percent of its dry weight of water. For example, if there is ten pounds of dry silica gel within the channel and it is exposed to 100 percent relative humidity conditions, the silica gel will absorb an additional four pounds of water out of the air flowing through the channel thereafter resulting in a total weight of 14 pounds. When the silica gel is saturated it has absorbed all of the water that it is capable under this condition.

The degree of saturation of the silica gel within the channel can be determined by the use of "indicator" silica gel particles 26 disposed so that it can be viewed through a window 28 in the box. The window 28 preferably is recessed so as not to protrude from the surface of the box if used as a picture frame or the like, but for purposes of illustration is disclosed in the drawings as a protuburance. Indicator particles of silica gel are those which change color as they become wet. For example, these particles are generally purple when dry and become pink when wet. Disposing the window 28 and indicator particles at or adjacent the top of the channel 20, the saturated condition of the entire desiccant within the dehumidifier can be determined.

Figure 5:
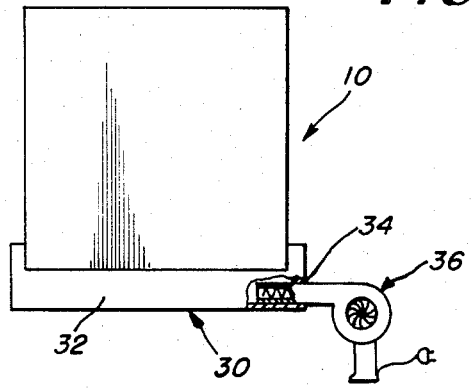
FIG. 5 is a diagrammatic elevational view of the dehumidifier illustrated in FIG. 1 disposed within a heating box illustrating one method in which the desiccant may be reactivated.

When the desiccant on the walls of the channel has become saturated or wet to a desired amount, the desiccant can be regenerated by heating so as to release the water and dry the desiccant. The regeneration can be performed by any of a number of methods. A preferred regeneration of the desiccant is illustrated in FIG. 5 wherein a regeneration box 30 is formed for receiving the dehumidifier box such that the channel is disposed in substantially sealed relationship with a plenum chamber 32 in the regeneration box 30. A source of hot air may thereafter be applied to an inlet 34 in the regeneration box so that hot air can flow from the plenum chamber 32 up into the channel and heat the desiccant to release the water. A conventional hair dryer 36 may be inserted into the inlet 34 to supply the required hot air, the air entering the box being in a range of approximately 120° F. to 150° F. This regeneration of the silica gel particles may be accomplished in a garage, outside the house, or in, for example, a bathroom having an outside vent so that the water vapor released does not reenter the air stream in the room in which the dehumidifier is performing its function. Another device contemplated for regeneration of the desiccant particles may be a regeneration box having a solar collector including air heating capability. In any event, regeneration or drying out of the particles can be determined by the indicator particles 26 as viewed through the window.

Figure 3:
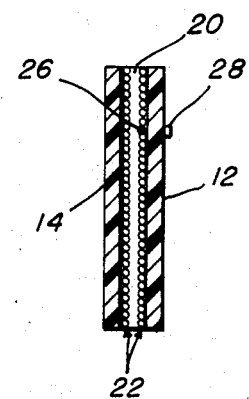
FIG. 3 is a cross sectional view taken substantially along line 3—3 of FIG. 2.
Figure 2:
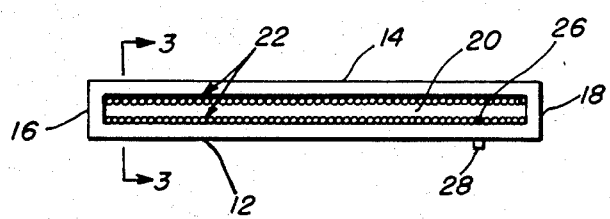
FIG. 2 is a top plan view of the dehumidifier illustrated in FIG. 1.
Figure 4:
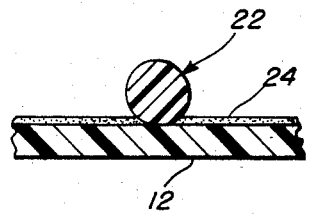
FIG. 4 is a fragmentary cross sectional view of the interior wall of the dehumidifier illustrated in FIG. 1 greatly enlarged.
Figure 6:
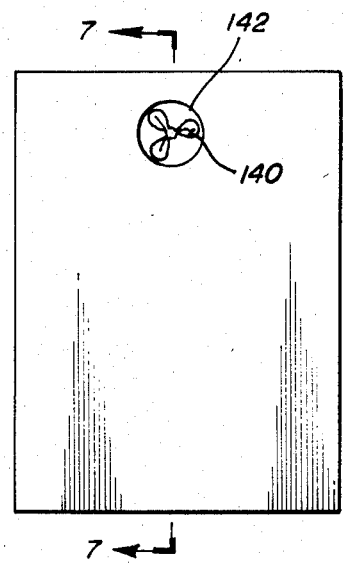
FIG. 6 is a view similar to FIG. 1 of another embodiment thereof.
Figure 7:
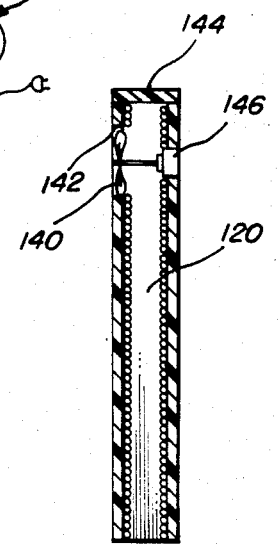
FIG. 7 is a cross sectional view taken substantially along line 7—7 of FIG. 6.

An alternate embodiment of the invention is disclosed in FIGS. 6 and 7 wherein controlled amounts of air may be processed by the dehumidifier in a given time. In this embodiment the dehumidifier 110 may have a configuration similar to that of FIGS. 1 through 3 but a motor driven fan 140 may be inserted within the channel 120 and the air may be drawn up through the channel and exhausted through an opening 142 communicating with the channel adjacent the top thereof. If the opening is disposed in the front or rear wall of the box, the box may have a top closure member 144. The motor 146 which drives the fan may be utilized during the subsequent regeneration cycle to draw in hot air from a source.

Other desiccant holders contemplated by this invention can include a honeycomb or ribbed box which may be installed in the return air duct of the residence. Similarly a dehumidifier box of this nature may be installed in the air vent outlets of the various rooms receiving air from conventional air distribution systems in a residence.

It may be seen that a relatively simple and inexpensive dehumidifier can be utlized in a residence to reduce the relative humidity of the air. When used in conjunction with residential air conditioning systems during very high humidity conditions, the load on the air conditioning system can be reduced thereby to lower the energy consumption and the cost for controlling the comfort of those residing therein. It is well known that in most instance human discomfort in hot humid weather is more dependent upon the relative humidity than the temperature, such that when used in conjunction with an air conditioning system the energy cost can be reduced substantially.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A dehumidifier package for use in a room, said package comprising a container having a front and a rear wall, a pair of opposed end walls fastened to said front and rear wall at spaced locations to form a space between facing interior surfaces of said front and rear walls, each of said walls having top and bottom edges defining the top and bottom of said container respectively, a layer of desiccant particles bonded to each of said facing interior surfaces extending into said space, the desiccant on the respective faces being spaced one from the other so that a channel is formed therebetween, means defining an opening in the bottom of said container communicating with said channel for permitting ingress of ambient air into said channel through said opening, and means forming an air exit in said container adjacent the top for permitting egress of air from said channel.

2. A dehumidifier package as recited in claim 1, wherein said desiccant is silica gel.

3. A dehumidifier package as recited in claim 2, wherein said particles of silica gel are bonded to said interior surfaces of said front and rear walls by a film of silican rubber.

4. A dehumidifier package as recited in claim 1, wherein said means defining an opening in said bottom comprises the bottom of said front, rear and end walls, and said means forming an air exit comprises the top margins of said front, rear and end walls.

5. A dehumidifier package as recited in claim 4, wherein said desiccant is silica gel.

6. A dehumidifier package as recited in claim 5, wherein said particles of silica gel are bonded to said interior surfaces of said front and rear walls by a film of silican rubber.

7. A dehumidifier package as recited in claim 1, wherein said means defining an opening in said bottom comprises the bottom margin of said front, rear and end walls, and said means for forming an exit comprises a portal in one of said front and rear walls, and a powered fan disposed in said portal for forcibly drawing air through said channel.

8. A dehumidifier package as recited in claim 7, wherein said desiccant is silica gel.

9. A dehumidifier package as recited in claim 8, wherein said particles of silica gel are bonded to said interior surfaces of said front and rear walls by a film of silican rubber.

10. The combination of a desiccant dehumidifier for use in a room and a drying chamber for reactivating the desiccant when it is saturated, said dehumidifier comprising a container having a front and a rear wall, a pair of opposed end walls fastened to said front and rear wall at spaced locations to form a space between facing interior surfaces of said front and rear walls, each of said walls having top and bottom edges defining the top and bottom of said container respectively, a layer of desiccant particles bonded to each of said facing interior surfaces extending into said space, the desiccant on the respective faces being spaced one from the other so that a channel is formed therebetween, means defining an opening in the bottom of said container communicating with said channel for permitting ingress of ambient air into said channel through said opening, and means forming an air exit in said container adjacent the top for permitting egress of air from said channel, said means defining an opening in said bottom comprising the bottom margins of said front, rear and end walls, said drying chamber comprising a base for securely receiving the bottom of said container, said base having a plenum chamber communicating with said channel when the container is received in said base, and an air opening in said base communicating with said plenum chamber and for receiving a source of hot air.

11. The combination of a desiccant dehumidifier and a drying chamber as recited in claim 10, wherein said means forming an air exit comprises the top margins of said front, rear and end walls.

12. The combination of a desiccant dehumidifier and a drying chamber as recited in claim 11, wherein said desiccant is silica gel.

13. The combination of a desiccant dehumidifier and a drying chamber as recited in claim 12, wherein said particles of silica gel are bonded to said interior surfaces of said front and rear walls by a film of silican rubber.

* * * * *